United States Patent
Ng et al.

(10) Patent No.: US 9,128,624 B2
(45) Date of Patent: Sep. 8, 2015

(54) FLASH MEMORY STORAGE SYSTEM FOR SIMULATING REWRITABLE DISC DEVICE, FLASH MEMORY CONTROLLER, COMPUTER SYSTEM, AND METHOD THEREOF

(75) Inventors: Hon-Wai Ng, Miaoli (TW); Yi-Hsiang Huang, Hsinchu (TW); Shih-Hsien Hsu, Changhua County (TW); Hsiang-Hsiung Yu, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 1266 days.

(21) Appl. No.: 12/691,996

(22) Filed: Jan. 22, 2010

(65) Prior Publication Data

US 2011/0145480 A1    Jun. 16, 2011

(30) Foreign Application Priority Data

Dec. 10, 2009  (TW) ............................... 98142336 A

(51) Int. Cl.
  *G06F 3/00* (2006.01)
  *G06F 3/06* (2006.01)
  G06F 12/02 (2006.01)

(52) U.S. Cl.
  CPC .............. *G06F 3/0626* (2013.01); *G06F 3/061* (2013.01); *G06F 3/0661* (2013.01); *G06F 3/0664* (2013.01); *G06F 3/0679* (2013.01); G06F 12/0246 (2013.01)

(58) Field of Classification Search
  CPC ............ G06F 11/1068; G06F 12/0238; G06F 12/0284; G06F 3/0677; G06F 2212/211; G06F 3/0679; G06F 3/0664; G11B 2220/2562; G11B 20/10; G11B 2220/216; G11B 20/1217; G11B 2220/2575
  See application file for complete search history.

(56) References Cited

U.S. PATENT DOCUMENTS 5,319,504 A * 6/1994 Shih ................................ 360/53
6,697,076 B1 * 2/2004 Trivedi et al. ................. 345/568
(Continued)

FOREIGN PATENT DOCUMENTS

CN      1591307 A    3/2005
CN    101097551 A    1/2008
(Continued)

OTHER PUBLICATIONS

"First Office Action of China Counterpart Application", issued on Apr. 18, 2012, p. 1-p. 11.

(Continued)

*Primary Examiner* — Reginald Bragdon
*Assistant Examiner* — Thanh D Vo
(74) *Attorney, Agent, or Firm* — J.C. Patents

(57) ABSTRACT

A flash memory storage system including a flash memory chip, a connector, and a controller is provided. The flash memory chip has a plurality of physical blocks. The connector is configured to couple to a host system. The controller is coupled to the flash memory chip and the connector. The controller configures a plurality of logical blocks and maps the logical blocks to a portion of the physical blocks. In addition, the controller identifies rewritable disc commands from the host system and writes data from the host system into the physical blocks mapped to the logical blocks according to the rewritable disc commands. Thereby, a rewritable disc device is simulated by using the flash memory storage system.

40 Claims, 7 Drawing Sheets

(56) References Cited

U.S. PATENT DOCUMENTS

| | | |
|---|---|---|
| 7,111,121 B2 * | 9/2006 | Oishi et al. ............... 711/115 |
| 7,306,160 B2 * | 12/2007 | Takiar et al. ............... 235/492 |
| 7,496,493 B1 * | 2/2009 | Stevens ............... 703/24 |
| 2003/0004981 A1 * | 1/2003 | Kaneda et al. ............... 707/204 |
| 2004/0130992 A1 * | 7/2004 | Idobuchi ............... 369/53.37 |
| 2005/0152679 A1 * | 7/2005 | Matsuno et al. ............... 386/95 |
| 2006/0015676 A1 * | 1/2006 | Oribe et al. ............... 711/103 |
| 2007/0036050 A1 * | 2/2007 | Lee ............... 369/47.16 |
| 2009/0313422 A1 * | 12/2009 | Lin et al. ............... 711/103 |

FOREIGN PATENT DOCUMENTS

| | | |
|---|---|---|
| CN | 101211626 A | 7/2008 |
| WO | 2009126011 | 10/2009 |

OTHER PUBLICATIONS

"Office Action of Japan Counterpart Application", issued on Apr. 17, 2012, p. 1-p. 2.

* cited by examiner

FLASH MEMORY STORAGE SYSTEM FOR SIMULATING REWRITABLE DISC DEVICE, FLASH MEMORY CONTROLLER, COMPUTER SYSTEM, AND METHOD THEREOF

CROSS-REFERENCE TO RELATED APPLICATION

This application claims the priority benefit of Taiwan application serial no. 98142336, filed on Dec. 10, 2009. The entirety of the above-mentioned patent application is hereby incorporated by reference herein and made a part of this specification.

BACKGROUND

1. Technology Field

The present invention generally relates to a flash memory storage system, and more particularly, to a flash memory storage system for simulating a rewritable disc device, a flash memory controller, a computer system equipped with the flash memory storage system, and a method for simulating a rewritable disc.

2. Description of Related Art

A rewritable digital versatile disc (DVD) drive is an optical disc storage device. A DVD has gradually replaced the conventional compact disc (CD) for storing high-definition video data, high-quality audio data, and large data thanks to the large capacity thereof. A DVD has to be accessed through an optical pickup of a DVD drive. However, because of the large volume and high power consumption of the DVD drive 2002 (as shown in FIG. 1A), a small computer (for example, a netbook) is usually not equipped with any DVD drive, which is very inconvenient to the user. In addition, because the DVD drive 2002 uses a mechanical optical pickup to read data from or burn data into the DVD 2004, the access speed of the DVD drive 2002 is very slow. Moreover, the DVD 2004 is inconvenient to be carried around due to the large volume thereof.

Aforementioned problems can be resolved if the DVD drive 2002 is replaced by a flash drive 2006 having a flash memory as its storage medium because of the data non-volatility, low power consumption, small volume, and non-mechanical structure of the flash memory.

A universal serial bus (USB) storage device using a flash memory as its storage medium is disclosed in U.S. Pat. No. 7,111,121, wherein the USB storage device simulates a CD-ROM device so that data stored in the USB storage device can be prevented from being accidentally deleted. However, a user cannot rewrite data by using the CD-ROM device simulated by the USB storage device and therefore the requirement of data rewritability cannot be satisfied.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a flash memory storage system that can simulate a rewritable disc device.

The present invention is directed to a flash memory controller that can simulate a rewritable storage medium by using a flash memory chip.

The present invention is directed to a computer system that can access a flash memory storage device according to rewritable disc commands.

The present invention is directed to a method that can simulate a rewritable disc device by using a flash memory storage device.

An exemplary embodiment of the present invention provides a flash memory storage system including a flash memory chip, a connector, and a controller. The flash memory chip has a plurality of physical blocks. The connector is configured to couple to a host system. The controller is coupled to the flash memory chip and the connector. The controller configures a plurality of logical blocks and maps the logical blocks to a portion of the physical blocks. In addition, the controller identifies at least one rewritable disc command from the host system and writes data from the host system into the physical blocks mapped to at least a portion of the logical blocks according to the at least one rewritable disc command.

The present invention provides a flash memory storage system including a flash memory chip, a connector, and a controller. The flash memory chip has a plurality of physical blocks. The connector is configured to couple to a host system. The controller is coupled to the flash memory chip and the connector. The controller configures a plurality of logical blocks and maps the logical blocks to a portion of the physical blocks. One of the physical blocks stores at least one management information of a rewritable disc device. By configuring the controller and the at least one management information of the rewritable disc device, the flash memory storage system allows the host system to identify at least a portion of the logical blocks as a rewritable storage medium of the rewritable disc device when the flash memory storage system is coupled to the host system.

The present invention provides a flash memory controller for managing a plurality of physical blocks of a flash memory chip. The flash memory controller includes a microprocessor unit, a flash memory interface unit, a host interface unit, and a memory management unit. The flash memory interface unit is coupled to the microprocessor unit and configured to couple to the flash memory chip. The host interface unit is coupled to the microprocessor unit and configured to couple to a host system. The memory management unit is coupled to the microprocessor unit. The memory management unit configures a plurality of logical blocks and maps the logical blocks to a portion of the physical blocks. In addition, the memory management unit identifies at least one rewritable disc command from the host system and writes data from the host system into the physical blocks mapped to at least a portion of the logical blocks according to the at least one rewritable disc command.

The present invention provides a computer system including a central processing unit (CPU), a main memory, and an embedded flash memory storage device. The embedded flash memory storage device is coupled to the CPU and includes a flash memory chip and a controller, wherein the flash memory chip has a plurality of physical blocks, and the controller is coupled to the flash memory chip. The controller configures a plurality of logical blocks and maps the logical blocks to a portion of the physical blocks. In addition, the controller identifies at least one rewritable disc command from the CPU and writes data into the physical blocks mapped to at least a portion of the logical blocks according to the at least one rewritable disc command.

The present invention provides a computer system including a CPU, a main memory, a card reader, and a removable memory card. The card reader is coupled to the CPU and has a card reader controller, wherein the card reader controller declares that the card reader is a rewritable disc device to the CPU. The removable memory card is plugged into the card reader. The removable memory card includes a flash memory chip and a memory card controller, wherein the flash memory chip has a plurality of physical blocks, and the memory card controller is coupled to the flash memory chip. The memory card controller configures a plurality of logical blocks and maps the logical blocks to a portion of the physical blocks. In addition, the card reader controller identifies at least one rewritable disc command from the CPU and writes data into the physical blocks mapped to at least a portion of the logical blocks according to the at least one rewritable disc command.

The present invention provides a flash memory storage system including a card reader and a removable memory card. The card reader has a card reader controller, and the card reader controller declares that the card reader is a rewritable disc device to a host system. The removable memory card is plugged into the card reader. The removable memory card includes a flash memory chip and a memory card controller, wherein the flash memory chip has a plurality of physical blocks, and the memory card controller is coupled to the flash memory chip. The memory card controller configures a plurality of logical blocks and maps the logical blocks to a portion of the physical blocks. The card reader controller identifies at least one rewritable disc command from the host system and writes data from the host system into the physical blocks mapped to at least a portion of the logical blocks according to the at least one rewritable disc command.

The present invention provides a method for simulating a rewritable disc device by using a flash memory storage device. The flash memory storage device has a flash memory chip, wherein the flash memory chip has a plurality of physical blocks. The present method includes configuring a plurality of logical blocks and mapping the logical blocks to a portion of the physical blocks, wherein the logical blocks have a plurality of logical addresses, the physical blocks have a plurality of physical addresses, and a mapping relationship exists between the logical addresses and the physical addresses. The present method also includes storing at least one management information of the rewritable disc device in one of the physical blocks and responding to a host system to access the flash memory storage device according to the at least one management information of the rewritable disc device. The present method further includes calculating a written logical address and the quantity of written data corresponding to a write command of at least one rewritable disc command given by the host system by using a conversion parameter, wherein the written logical address is one of the logical addresses.

As described above, the flash memory storage system, the flash memory controller, the computer system and the method according to the exemplary embodiments of the present invention are capable of simulating a rewritable disc by using a flash memory chip.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
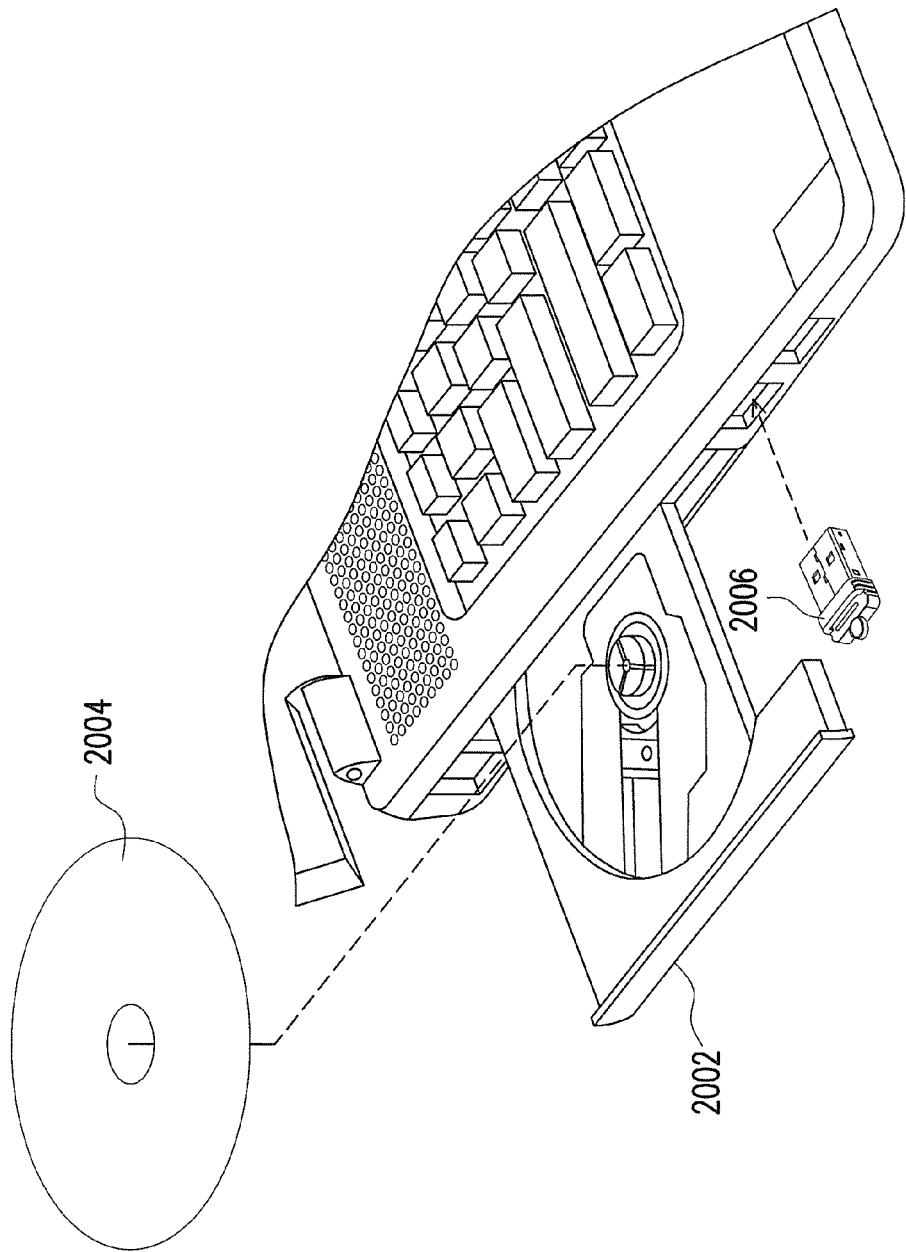
FIG. 1A is a diagram of a conventional rewritable disc device and a flash drive.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a flash memory storage device (also referred to as a flash memory storage system) includes a flash memory chip and a controller (also referred to as a control circuit). A flash memory storage device is usually used together with a host system so that the host system can write data into or read data from the flash memory storage device. In addition, a flash memory storage device may also include an embedded flash memory and a software that is executed on a host system to substantially serve as a controller of the embedded flash memory.

Figure 1B:
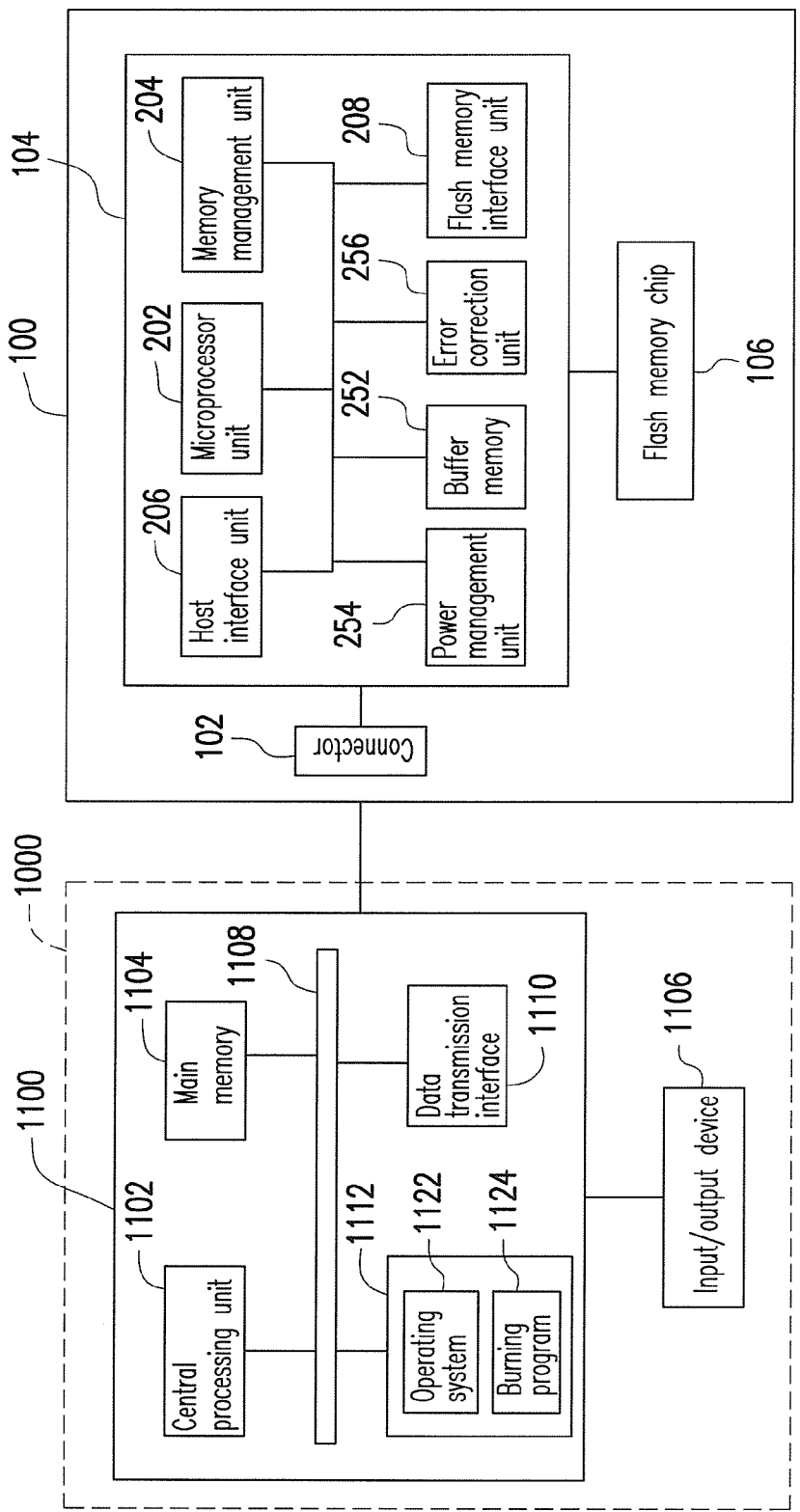
FIG. 1B is a block diagram of a host system and a flash memory storage device according to a first exemplary embodiment of the present invention.

FIG. 1B is a block diagram of a host system and a flash memory storage device according to a first exemplary embodiment of the present invention.

Referring to FIG. 1B, the host system 1000 includes a computer 1100 and an input/output (I/O) device 1106.

The computer 1100 includes a central processing unit (CPU) 1102, a main memory 1104, a system bus 1108, a data transmission interface 1110, and a main disc drive 1112. The computer 1100 may be a desktop computer or a notebook computer.

The CPU 1102 is configured to interpret commands and execute major operations. The main memory 1104 is configured to temporarily store data and programs. The system bus 1108 is configured to connect various components of the host system 1000. The data transmission interface 1110 is configured to connect with various peripheral devices. The main disc drive 1112 is configured to install an operating system (OS) 1122 and a burning program 1124. The OS 1122 is configured to manage hardware and software of the host system 1000. In the present exemplary embodiment, the OS 1122 may be Microsoft Windows 7. However, the present invention is not limited thereto. The burning program 1124 is configured to provide a user interface such that a user may burn data into a flash memory storage device 100 or erase data from the same.

Figure 1C:
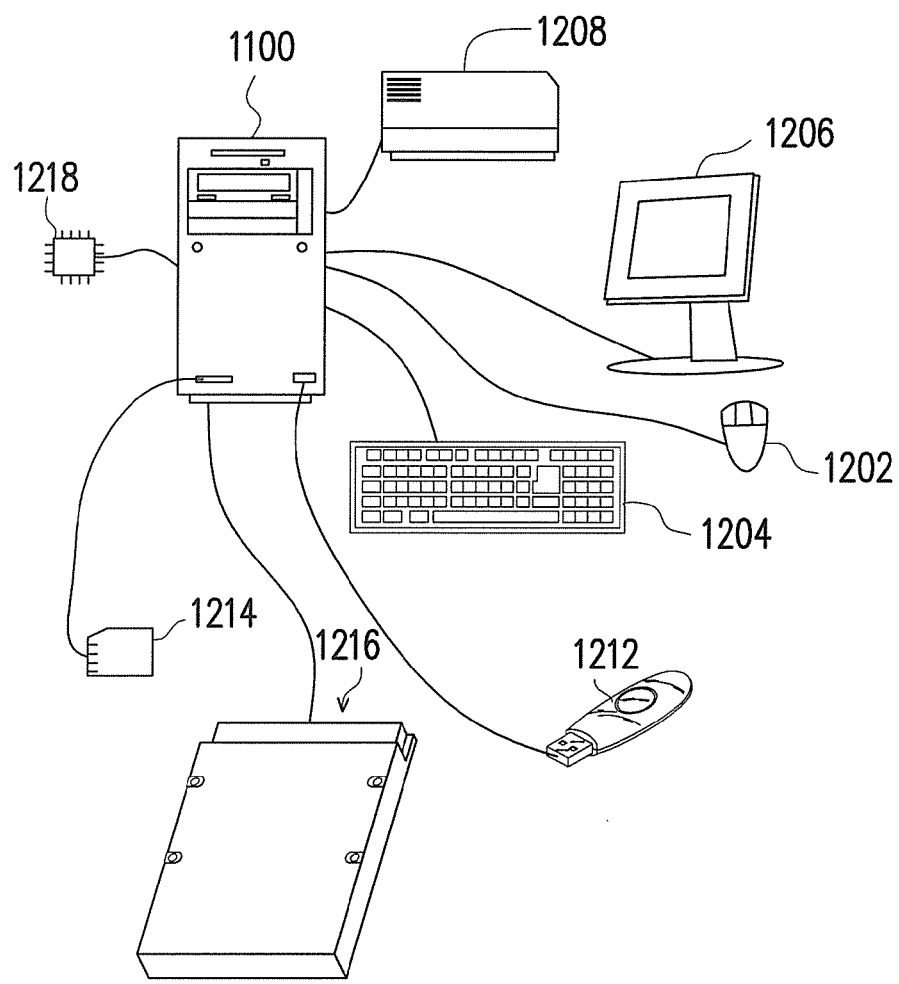
FIG. 1C is a diagram of a computer, an input/output device, and a flash memory storage device according to an exemplary embodiment of the present invention.

The I/O device 1106 includes a mouse 1202, a keyboard 1204, a display 1206, and a printer 1208, as shown in FIG. 1C. It should be understood that the devices illustrated in FIG. 1C are not intended to limit the I/O device 1106, and the I/O device 1106 may further include other devices.

In the present embodiment, the flash memory storage device 100 is coupled to other components of the host system 1000 through the data transmission interface 1110. The host system 1000 can write data into or read data from the flash memory storage device 100 through the operations of the CPU 1102, the main memory 1104, the I/O device 1106, and the main disc drive 1112. The flash memory storage device 100 may be a flash drive 1212, a memory card 1214, a solid state drive (SSD) 1216, or an embedded storage device 1218, as shown in FIG. 1C. It should be mentioned that if the flash memory storage device 100 is implemented as an embedded storage device (i.e., the embedded storage device 1218), the embedded flash memory storage device 100 is directly embedded in a motherboard (not shown) of the host system 1000.

The flash memory storage device 100 includes a connector 102, a flash memory controller 104, and a flash memory chip 106.

The connector 102 is coupled to the flash memory controller 104 and configured to couple to the host system 1000. In the present exemplary embodiment, the connector 102 is a universal serial bus (USB) connector. However, the present invention is not limited thereto, and the connector 102 may also be a parallel advanced technology attachment (PATA) connector, a serial advanced technology attachment (SATA) connector, an Institute of Electrical and Electronic Engineers (IEEE) 1394 connector, a peripheral component interconnect (PCI) express connector, a secure digital (SD) interface connector, a memory stick (MS) interface connector, a multi media card (MMC) interface connector, a compact flash (CF) interface connector, an integrated device electronics (IDE) connector, or other suitable connector.

The flash memory controller 104 is configured to execute a plurality of logic gates or control instructions implemented in a hardware or firmware form and perform various data operations on the flash memory chip 106 according to instructions of the host system 1000. The flash memory controller 104 includes a microprocessor unit 202, a memory management unit 204, a host interface unit 206, and a flash memory interface unit 208.

The microprocessor unit 202 is the main control unit of the flash memory controller 104, and which cooperates with the memory management unit 204, the host interface unit 206, and the flash memory interface unit 208 to carry out various operations of the flash memory storage device 100.

The memory management unit 204 is coupled to the microprocessor unit 202 and configured to execute a data writing mechanism and a block management mechanism according to the present exemplary embodiment. In particular, the memory management unit 204 declares that the flash memory storage device 100 is a rewritable digital versatile disc (DVD) device to the host system 1000, establishes management information of the rewritable DVD device, and responds to the host system 1000 to access the flash memory storage device 100 according to the management information.

For example, the memory management unit 204 declares that the flash memory storage device 100 is a disc device conforming to the DVD+RW specification, the DVD-RW specification, the DVD-RAM specification, or the blu-ray disc (BD) specification to the host system 1000. After that, the memory management unit 204 identifies rewritable DVD commands received from the host system 1000 and operates the flash memory chip 106 according to the rewritable DVD commands. For example, the memory management unit 204 burns data received from the host system 1000 into the flash memory chip 106 according to rewritable DVD commands. Namely, when a user of the host system 1000 operates the flash memory storage device 100 through a burning program 1124 of the rewritable DVD device, the memory management unit 204 identifies the burning commands and performs various data operations on the flash memory chip 106 according to the burning commands. Below, the operation of the memory management unit 204 will be described in detail with reference to accompanying drawings.

In the present exemplary embodiment, the memory management unit 204 is implemented in the flash memory controller 104 as a firmware form. For example, the memory management unit 204 including a plurality of control instructions is burnt into a program memory (for example, a read only memory (ROM)), and the program memory is embedded into the flash memory controller 104. When the flash memory storage device 100 is in operation, the control instructions of the memory management unit 204 are executed by the microprocessor unit 202, so as to accomplish the burning mechanism (for example, the reading, writing, and erasing of data) and the flash memory management mechanism according to embodiments of the present invention.

In another exemplary embodiment of the present invention, the control instructions of the memory management unit 204 may also be stored in a specific area (for example, a system area in the flash memory chip exclusively used for storing system data) of the flash memory chip 106 as program codes. Similarly, the control instructions of the memory management unit 204 are executed by the microprocessor unit 202 when the flash memory storage device 100 is in operation. Additionally, in yet another exemplary embodiment of the present invention, the memory management unit 204 may also be implemented in the flash memory controller 104 as a hardware form.

The host interface unit 206 is coupled to the microprocessor unit 202 and configured to receive and identify commands and data from the host system 1000. Namely, commands and data received from the host system 1000 are transmitted to the microprocessor unit 202 through the host interface unit 206. In the present exemplary embodiment, the host interface unit 206 is a USB interface corresponding to the connector 102. However, the present invention is not limited thereto, and the host interface unit 206 may also be a PATA interface, a SATA interface, an IEEE 1394 interface, a PCI express interface, a SD interface, a MS interface, a MMC interface, a CF interface, an IDE interface, or other suitable data transmission interface.

The flash memory interface unit 208 is coupled to the microprocessor unit 202 and configured to access the flash memory chip 106. Namely, data to be written into the flash memory chip 106 is converted by the flash memory interface unit 208 into a format acceptable to the flash memory chip 106.

In an exemplary embodiment of the present invention, the flash memory controller 104 further includes a buffer memory 252, a power management unit 254, and an error correction unit 256.

The buffer memory 252 is coupled to the microprocessor unit 202 and temporarily stores data and commands received from the host system 1000 or data received from the flash memory chip 106.

The power management unit 254 is coupled to the microprocessor unit 202 and configured to control the power supply of the flash memory storage device 100.

The error correction unit 256 is coupled to the microprocessor unit 202 and configured to execute an error correction procedure to ensure the accuracy of data. To be specific, when the memory management unit 204 receives a write command from the host system 1000, the error correction unit 256 generates an error checking and correcting (ECC) code for the data corresponding to the write command, and the memory management unit 204 writes both the data and the corresponding ECC code into the flash memory chip 106. Subsequently, when the memory management unit 204 reads the data from the flash memory chip 106, it also reads the ECC code corresponding to the data, and the error correction unit 256 executes the error correction procedure on the data according to the ECC code.

The flash memory chip 106 is coupled to the flash memory controller 104 and configured to store data. The flash memory chip 106 has a plurality of physical blocks. In a flash memory, each physical block is the smallest erasing unit. Namely, each physical block contains the least number of memory cells that are erased together. Each physical block has a plurality of physical addresses. In the present exemplary embodiment, the physical addresses are physical pages. However, the present invention is not limited thereto. Each physical page is the smallest programming unit. Namely, each physical page is the smallest unit for writing or reading data. Each physical page usually includes a user data area and a redundant area. The user data area stores user data, while the redundant area stores system data (for example, the ECC code). In the present exemplary embodiment, the flash memory chip 106 is a multi level cell (MLC) NAND flash memory chip. However, the present invention is not limited thereto, and the flash memory chip 106 may also be a single level cell (SLC) NAND flash memory chip.

Figure 2:
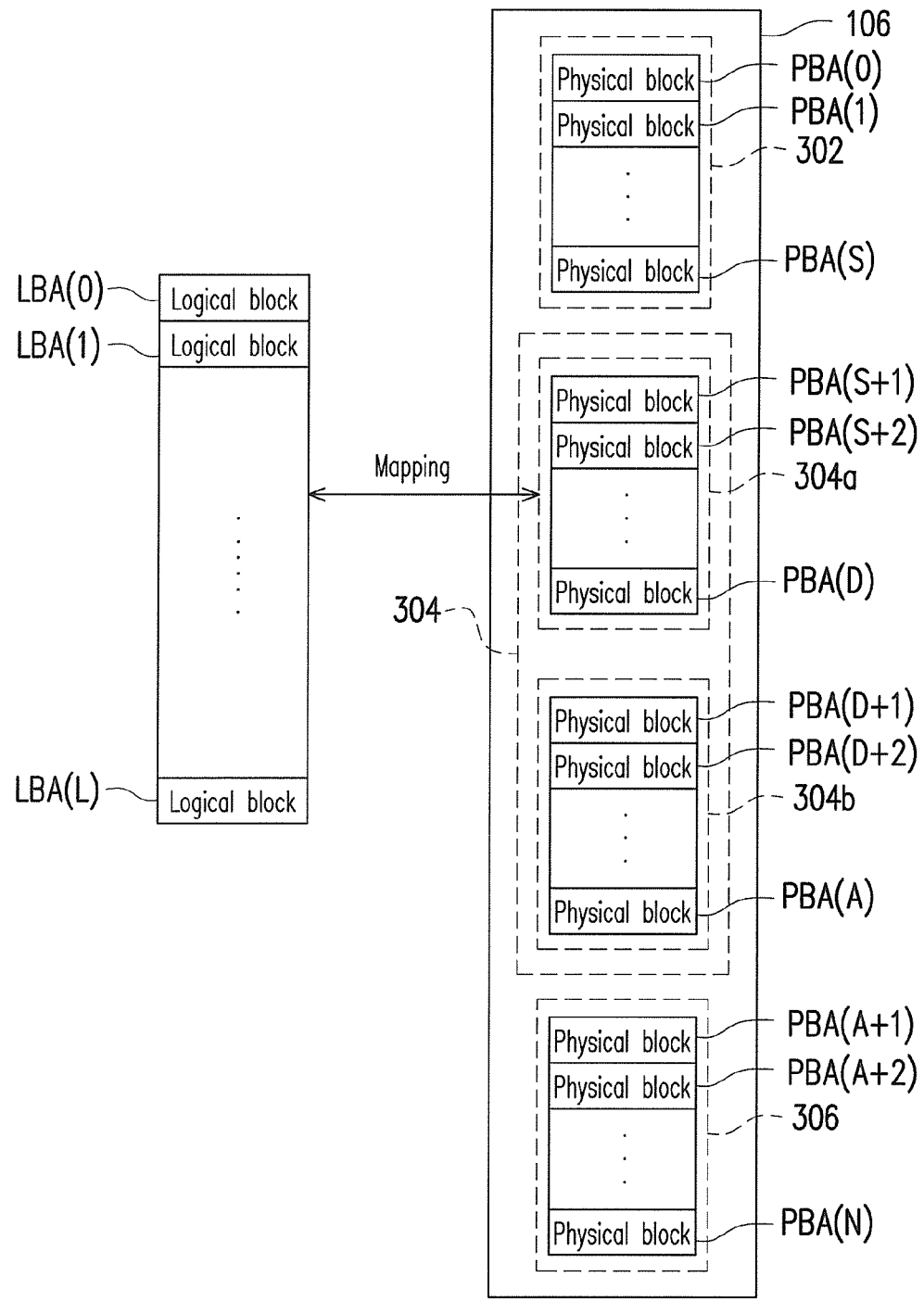
FIG. 2 is a block diagram of a flash memory chip according to an exemplary embodiment of the present invention.

FIG. 2 is a block diagram of a flash memory chip according to an exemplary embodiment of the present invention.

Referring to FIG. 2, the flash memory chip 106 has physical blocks PBA(0)-PBA(N). Each physical block is the smallest erasing unit. Namely, each physical block contains the least number of memory cells that are erased together. Each physical block has 128 physical addresses (i.e., physical pages). However, the present invention is not limited thereto, and in another exemplary embodiment of the present invention, each physical block may also have 64, 256, or other suitable number of physical addresses.

The memory management unit 204 logically groups the physical blocks PBA(0)-PBA(N) into a system area 302, a storage area 304, and a replacement area 306.

The physical blocks PBA(0)-PBA(S) logically belonging to the system area 302 are used for recording system data, such as the manufacturer and model of the flash memory chip and the number of physical addresses corresponding to each physical block.

The physical blocks PBA(S+1)-PBA(A) logically belonging to the storage area 304 are used for storing data written by the host system 1000. Namely, the flash memory storage device 100 uses the physical blocks in the storage area 304 for actually storing data received from the host system 1000. To be specific, the physical blocks PBA(S+1)-PBA(A) in the storage area 304 are further grouped into a data area 304a and a spare area 304b, wherein the physical blocks PBA(S+1)-PBA(D) in the data area 304a are physical blocks containing data, and the physical blocks PBA(D+1)-PBA(A) in the spare area 304b are physical blocks that are not used for storing data yet. To be more specific, when the memory management unit 204 gets a physical block from the spare area 304b and writes data into the gotten physical block, the gotten physical block is associated to the data area 304a, and when a physical block associated to the data area 304a is erased, the erased physical block is associated to the spare area 304b.

The physical blocks PBA(A+1)-PBA(N) logically belonging to the replacement area 306 are replacement physical blocks. For example, when the flash memory chip 106 is manufactured, 4% of its physical blocks are reserved for the purpose of replacement. Namely, when the physical blocks in the system area 302 and the storage area 304 are damaged, the physical blocks reserved in the replacement area 306 can be used for replacing the damaged physical blocks (i.e., bad blocks). Thus, if there are still normal physical blocks in the replacement area 306 and a physical block is damaged, the memory management unit 204 gets a normal physical block from the replacement area 306 for replacing the damaged physical block. If there is no any normal physical block in the replacement area 306 and a physical block is damaged, the flash memory storage device 100 is declared as being in a write protected status and cannot be used for writing data.

It should be understood that in the operation of the flash memory storage device 100, the grouping relationship that the physical blocks PBA(0)-PBA(N) are grouped into the system area 302, the data area 304a, the spare area 304b, and the replacement area 306 dynamically changes. Namely, when the memory management unit 204 writes data into a physical block (for example, the physical block PBA(D+2)) originally belonging to the spare area 304b, the physical block is associated to the data area 304a. Or, when a physical block in the data area 304a (or the spare area 304b) is damaged and accordingly is replaced by a physical block gotten from the replacement area 306, the physical block originally belonging to the replacement area 306 is associated to the data area 304a (or the spare area 304b).

Because the flash memory storage device 100 alternatively uses the physical blocks in the storage area 304 for storing data received from the host system 1000, the memory management unit 204 provides logical blocks LBA(0)-LBA(L) to be accessed by the host system 1000. To be specific, each logical block includes a plurality of logical addresses, and each logical address is mapped to a physical address of a physical block. Accordingly, the OS 1122 of the host system 1000 simply accesses data according to the logical addresses while the memory management unit 204 actually accesses the data in the corresponding physical addresses. In the present exemplary embodiment, the memory management unit 204 maps the logical blocks LBA(0)-LBA(L) to the physical blocks in the storage area 304 and records the mapping relationship between the logical blocks and the physical blocks in a logical block-physical block mapping table. In the present exemplary embodiment, the data to be written by the host system 1000 is written into the physical blocks belonging to the storage area 304, and the host system 1000 cannot access the physical blocks in the system area 302 and the replacement area 306.

Figure 3:
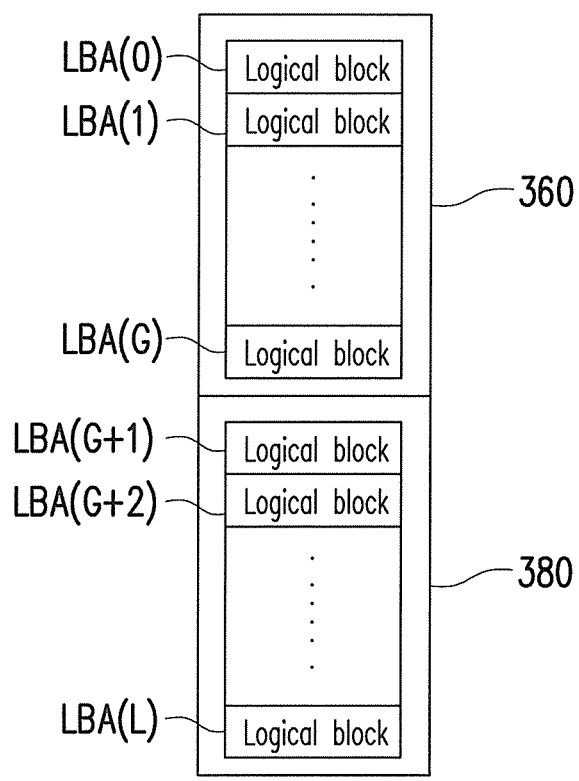
FIG. 3 is a diagram illustrating the configuration of logical blocks according to an exemplary embodiment of the present invention.

FIG. 3 is a diagram illustrating the configuration of logical blocks according to an exemplary embodiment of the present invention.

Referring to FIG. 3, the memory management unit 204 groups the logical blocks LBA(0)-LBA(L) into a first logical unit 360 and a second logical unit 380, wherein the first logical unit 360 includes the logical blocks LBA(0)-LBA(G), and the second logical unit 380 includes the logical blocks LBA(G+1)-LBA(L).

In the present exemplary embodiment, the memory management unit 204 configures the first logical unit 360 as a rewritable DVD device (for example, a disc device conforming to the DVD+RW specification, the DVD-RW specification, the DVD-RAM specification, or the blu-ray disc (BD) specification) and configures the second logical unit 380 as a large-capacity storage device (for example, a large-capacity storage device conforming to the file allocation table 32 (FAT32) format or the NTFS format).

Particularly, in the present exemplary embodiment, when the flash memory storage device 100 is coupled to the host system 1000, the CPU 1102 of the host system 1000 identifies that the flash memory storage device 100 is composed of a rewritable DVD device and a large-capacity storage device.

To be specific, when the CPU 1102 of the host system 1000 requests the device feature from the flash memory storage device 100, the memory management unit 204 declares to the host system 1000 that the flash memory storage device 100 is a large-capacity storage category and has the first logical unit 360 and the second logical unit 380. Subsequently, when the CPU 1102 requests the device feature of the first logical unit 360 from the flash memory storage device 100 (for example, the CPU 1102 inquires about the device feature of the first logical unit 360 through a 0×12 command), the memory management unit 204 declares to the host system 1000 that the first logical unit 360 is a rewritable DVD device (for example, the memory management unit 204 responds the host system 1000 with a 0×05 message), and when the CPU 1102 requests the device feature of the second logical unit 380 from the flash memory storage device 100, the memory management unit 204 declares to the host system 1000 that the second logical unit 380 is a large-capacity storage device (for example, the memory management unit 204 responds the host system 1000 with a 0×00 message). Accordingly, when the host system 1000 is about to burn data into the rewritable DVD device (i.e., the first logical unit 360) of the flash memory storage device 100, the memory management unit 204 writes the data from the host system 1000 into the physical blocks mapped to the logical blocks LBA(0)-LBA(G) of the first logical unit 360 according to rewritable DVD commands received from the host system 1000. In addition, when the host system 1000 is about to store data into the large-capacity storage device (i.e., the second logical unit 380) of the flash memory storage device 100, the memory management unit 204 writes the data from the host system 1000 into the physical blocks mapped to the logical blocks LBA(G+1)-LBA(L) of the second logical unit 380 according to disk commands received from the host system 1000.

It should be mentioned that even though in the present exemplary embodiment, the memory management unit 204 groups the logical blocks LBA(0)-LBA(L) into the first logical unit 360 with the rewritable DVD format and the second logical unit 380 with the disk format, the present invention is not limited thereto. For example, in another exemplary embodiment of the present invention, the second logical unit 380 may also be configured as a compact disc-read only memory (CD-ROM) device. Or, in yet another exemplary embodiment of the present invention, the second logical unit 380 may also be configured as another rewritable DVD device, and the memory management unit 204 declares that the second logical unit 380 is a rewritable DVD device (for example, a disc device conforming to the DVD+RW specification, the DVD-RW specification, the DVD-RAM specification, or the BD specification) to the host system 1000 and accesses data in the second logical unit 380 according to rewritable DVD commands. Moreover, in still another exemplary embodiment of the present invention, the memory management unit 204 may also configure all the logical blocks LBA(0)-LBA(L) as a rewritable DVD device or group the logical blocks LBA(0)-LBA(L) into more logical units and respectively configure these logical units as rewritable DVD devices, large-capacity storage devices, or compact disc-read only memory devices.

Herein, the memory management unit 204 of the flash memory controller 104 executes disc commands from the host system 1000, so as to perform in various data operations on the second logical unit 380, according to a general operation pattern. In addition, when the flash memory storage device 100 receives rewritable DVD commands given to the first logical unit 360, the memory management unit 204 responds with an appropriate message so as to simulate a rewritable DVD using the first logical unit 360. Below, the operation mechanism of the memory management unit 204 will be described in detail.

In an exemplary embodiment of the present invention, when the CPU 1102 of the host system 1000 sends a storage medium feature inquiry command (for example, an 0×46 command of the rewritable DVD commands) to the flash memory storage device 100 to obtain the storage medium feature of the first logical unit 360, the memory management unit 204 sends a single layer rewritable DVD message to the host system 1000. Accordingly, the CPU 1102 identifies the storage medium of the first logical unit 360 as a single layer rewritable DVD. It should be mentioned that in another exemplary embodiment of the present invention, the memory management unit 204 may also send the corresponding storage medium feature according to the capacity of the first logical unit 360. For example, if the capacity of the first logical unit 360 is smaller than or equal to 4.7 GB, the memory management unit 204 sends a single layer rewritable DVD message to the host system 1000. If the capacity of the first logical unit 360 is greater than or equal to 8.5 GB, the memory management unit 204 sends a double layers rewritable DVD message to the host system 1000.

In an exemplary embodiment of the present invention, when the CPU 1102 of the host system 1000 sends a capacity inquiry command (for example, a 0×25 command of rewritable DVD commands) to the flash memory storage device 100 to obtain the capacity of the first logical unit 360, the memory management unit 204 sends a capacity value back to the host system 1000 according to the capacity of the first logical unit 360. For example, if the total capacity is 15 GB, the memory management unit 204 declares to the host system 1000 that the capacity of the first logical unit 360 is 15 GB. It should be mentioned that in another exemplary embodiment of the present invention, the memory management unit 204 may also responds the host system 1000 according to the design specification of rewritable DVD when the total capacity is supported. For example, the memory management unit 204 declares to the host system 1000 that the capacity of the first logical unit 360 is 4.7 GB if the total capacity is 15 GB and the memory management unit 204 declares that the first logical unit 360 is a single layer rewritable DVD. Besides, the memory management unit 204 declares to the host system 1000 that the capacity of the first logical unit 360 is 8.5 GB if the total capacity is 15 GB and the memory management unit 204 declares that the first logical unit 360 is a double layers rewritable DVD.

In an exemplary embodiment of the present invention, the memory management unit 204 establishes a rewritable DVD blank flag. Herein the rewritable DVD blank flag is one of the management information of the rewritable DVD device, and records the storage status of the first logical unit 360. For example, if the flash memory storage device 100 is just manufactured and no data is written therein, the rewritable DVD blank flag is marked as a "blank status". If data is already written into the first logical unit 360 of the flash memory storage device 100, the rewritable DVD blank flag is marked as a "non-blank status". In the present exemplary embodiment, "0" in the rewritable DVD blank flag represents the "blank status" while "1" represents the "non-blank status". To be specific, the entire rewritable DVD has to be erased first when data is to be re-burnt into the same storage address of the rewritable DVD. Thus, the host system 1000 uses a clear command (for example, a 0×A1 command of the rewritable DVD commands) to clear the first logical unit 360. However, because data is erased in unit of physical blocks in the flash memory chip 106, a physical block is erased only when data is to be written into the physical block. When the CPU 1102 sends a clear command to the flash memory storage device 100, the memory management unit 204 marks the rewritable DVD blank flag as the "blank status" and responds the host system 1000 that the clear command is already executed. It should be mentioned that because the memory management unit 204 does not actually erase the physical blocks mapped to the first logical unit 360, the speed for the flash memory storage device 100 to execute the clear command is much faster than that for a general rewritable DVD device to do the same.

Additionally, when the CPU 1102 sends a format command (for example, a 0×04 command of the rewritable DVD commands) or a close section command (for example, a 0×5B command of the rewritable DVD commands) to the flash memory storage device 100, the memory management unit 204 marks the rewritable DVD blank flag as the "non-blank status".

In particular, when the CPU 1102 sends a read command (for example, a 0×28 command of the rewritable DVD commands) to the flash memory storage device 100 to read data from the first logical unit 360, the memory management unit 204 determines whether the rewritable DVD blank flag indicates the "blank status". If the rewritable DVD blank flag indicates the "blank status", the memory management unit 204 directly sends a null value to the host system 1000. If the rewritable DVD blank flag indicates the "non-blank status", the memory management unit 204 reads data from the physical blocks mapped to the first logical unit 360 for the host system 1000 according to the logical addresses indicated by the read command.

For example, in the present exemplary embodiment, the memory management unit 204 stores the rewritable DVD blank flag into a physical block in the system area 302. However, the present invention is not limited thereto, and in another exemplary embodiment of the present invention, the rewritable DVD blank flag may also be stored in another non-volatile memory (for example, a non-volatile memory additionally disposed in the flash memory controller 104).

In an exemplary embodiment of the present invention, the memory management unit 204 establishes a written capacity parameter. Herein the written capacity parameter is one of the management information of the rewritable DVD device, and records a written capacity of the first logical unit 360. To be specific, in a rewritable DVD device, data is sequentially burnt into storage addresses of a rewritable DVD. Accordingly, the host system 1000 uses a next writable address inquiry command (for example, a 0×52 command of the rewritable DVD commands) to inquire about a next writable address in the first logical unit 360. When the CPU 1102 sends a write command (for example, a 0×2A command of the rewritable DVD commands) to the flash memory storage device 100 to burn data into the first logical unit 360, the memory management unit 204 writes the data into the physical block mapped to the logical block corresponding to the logical address to be written and updates the written capacity parameter according to the capacity of the written data. In addition, when the CPU 1102 sends a format command or a clear command to the flash memory storage device 100, the memory management unit 204 initializes the written capacity parameter (for example, the written capacity parameter is reset to zero). In particular, when the CPU 1102 sends the next writable address inquiry command to the flash memory storage device 100, the memory management unit 204 responds the host system 1000 with a next writable address according to the written capacity parameter.

It should be mentioned that a close section is produced at the storage address of a rewritable DVD when a general rewritable DVD device executes a close section command on the rewritable DVD, and subsequent data has to be burnt after the close section. Accordingly, in the present exemplary embodiment, when the CPU 1102 sends a close section command to the flash memory storage device 100, even though the host system 1000 does not write any data, the memory management unit 204 still updates the written capacity parameter according to the size of the close section.

Similarly, in the present exemplary embodiment, the memory management unit 204 stores the written capacity parameter into a physical block in the system area 302. However, the present invention is not limited thereto, and in another exemplary embodiment of the present invention, the written capacity parameter may also be stored in another non-volatile memory (for example, a non-volatile memory additionally disposed in the flash memory controller 104).

In an exemplary embodiment of the present invention, when the CPU 1102 of the host system 1000 sends a read command or a write command to the flash memory storage device 100 to read data from or burn data into the first logical unit 360, the memory management unit 204 uses a conversion parameter to calculate a logical address and a data capacity indicated by the read command or the write command. To be specific, a logical access unit has 2048 bytes in a DVD system, while a logical access unit has 512 bytes in a flash memory storage system. Accordingly, the conversion parameter is set as 4 (=2048/512). For example, when the CPU 1102 is about to read data of 512 units starting from the logical address "512", the memory management unit 204 reads data of 2048 units starting from the physical address mapped to the logical address "2048".

In an exemplary embodiment of the present invention, when the CPU 1102 of the host system 1000 sends an error correction data inquiry command to the flash memory storage device 100, the memory management unit 204 sends a non-support message back to the host system 1000. To be specific, a DVD system uses an appropriate error correction algorithm to ensure the accuracy of data stored in a DVD. In the present exemplary embodiment, the error correction algorithm corresponding to the DVD system is not suitable for a flash memory system. Thus, the error correction unit 256 uses an error checking and correcting (ECC) code suitable for the flash memory chip 106 to ensure data accuracy. Accordingly, when the CPU 1102 is about to read an error correction data from the first logical unit 360, the memory management unit 204 responds with a non-support message to decline the error correction data inquiry command from the host system 1000.

In a DVD system, the host system 1000 can use a minute/second/frame (MSF) read command (for example, a 0×B9 command of the rewritable DVD commands) to read data with minute, second, and frame parameters. In an exemplary embodiment of the present invention, when the CPU 1102 of the host system 1000 sends a MSF read command to the flash memory storage device 100, the memory management unit 204 calculates the logical address indicated by the MSF read command through following expression (1):

$$LBA = ((M \times 60 + S - 2) \times 75 + F) \times 4 \qquad (1)$$

In foregoing expression, LBA represents the logical address corresponding to the MSF read command in the flash memory, M represents the minute parameter of the MSF read command, S represents the second parameter of the MSF read command, and F represents the frame parameter of the MSF read command. Namely, data of 1 minute is stored in 18000 (=60×75×4) physical addresses and each physical address has 512 bytes, data of 1 second is stored in 300 (=75×4) physical addresses and each physical address has 512 bytes, and data of 1 frame is stored in 4 physical addresses and each physical address has 512 bytes.

In a DVD system, the host system 1000 uses a disc eject command to eject a rewritable DVD in a rewritable DVD device. Particularly, in a DVD system, after the burning of a rewritable DVD is completed, because the storage information of the DVD is changed, the host system 1000 requests to eject the DVD and re-reads the storage information of the DVD after the DVD is inserted into the rewritable DVD device again. However, in a flash memory storage system, all the storage information (for example, a logical block-physical block mapping table) is temporarily stored in the buffer memory 252. Thus, the memory management unit 204 can obtain the latest information of the first logical unit 360 without having to unplug and re-plug the flash memory storage device 100. In an exemplary embodiment of the present invention, when the CPU 1102 of the host system 1000 sends a disc eject command to the flash memory storage device 100, the memory management unit 204 responds the host system 1000 with a received message but does not take any action. When subsequently the CPU 1102 inquires about the first logical unit 360, the memory management unit 204 directly sends a ready message back to the host system 1000.

In an exemplary embodiment of the present invention, the memory management unit 204 sets a write protect flag for recording whether the first logical unit 360 is in a "write-protected status" or a "non-write-protected status". To be specific, a user may set the write protect flag of the first logical unit 360 by using a vendor command through an application program. For example, if the user does not want data stored in the first logical unit 360 to be accidentally deleted, the user can request the memory management unit 204 to set the write protect flag as the "write-protected status" by issuing the vendor command through an application program installed in the host system 1000.

In another exemplary embodiment of the present invention, while modifying the write protect flag, the application program asks the user to input an identification password and sends the identification password and the setting data to the memory management unit 204. Then, the memory management unit 204 compares the identification password input by the user with a vendor password. The memory management unit 204 modifies the write protect flag according to the user's requirement only when the identification password input by the user matches the vendor password. Herein the memory management unit 204 stores the write protect flag and the vendor password in the system area 302. However, the present invention is not limited thereto, and in another exemplary embodiment of the present invention, the write protect flag and the vendor password may also be stored in another non-volatile memory (for example, a non-volatile memory additionally disposed in the flash memory controller 104).

In an exemplary embodiment of the present invention, when the CPU 1102 of the host system 1000 sends the clear command, the format command, or the close section command to the flash memory storage device 100, the memory management unit 204 determines whether the write protect flag indicates the "write-protected status". When the write protect flag indicates the "write-protected status", the memory management unit 204 sends an error message back to the host system 1000 or does not take any action. The error message may be "write protected (i.e., an ASC code 0×27 and a SenseKey code 0×07)", "medium does not exist (i.e., an ASC code 0×3A and a SenseKey code 0×02)", "medium is being changed (i.e., an ASC code 0×28 and a SenseKey code 0×06)", "command is not supported (i.e., an ASC code 0×20 and a SenseKey code 0×05)", "command parameter error (i.e., an ASC code 0×24 and a SenseKey code 0×05)", "data writing error (i.e., an ASC code 0×03 and a SenseKey code 0×03)", or "data writing error (i.e., an ASC code 0×11 and a SenseKey code 0×03)".

If the write protect flag indicates the "write-protected status", besides responding the host system 1000 with one of foregoing error messages, in another exemplary embodiment of the present invention, the memory management unit 204 may also directly modify the storage medium feature to prevent the host system 1000 from issuing any write or clear command. For example, when the CPU 1102 of the host system 1000 sends a storage medium feature inquiry command to the flash memory storage device 100, the memory management unit 204 determines whether the write protect flag indicates the "write-protected status". If the write protect flag indicates the "write-protected status", the memory management unit 204 sends a single layer read only DVD message or a double layers read only DVD message back to the host system 1000 to notify the host system 1000 that the first logical unit 360 is a read only DVD.

Figure 4:
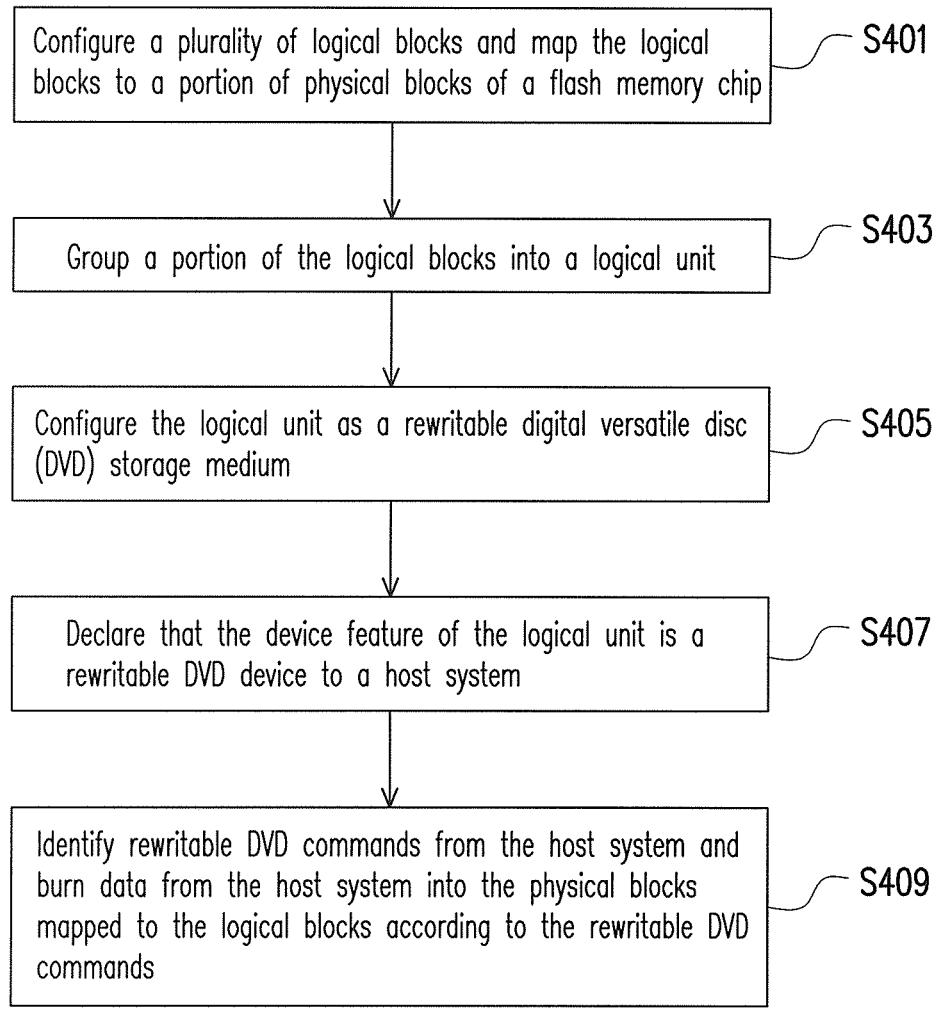
FIG. 4 is a flowchart of a method for simulating a rewritable digital versatile disc (DVD) according to an exemplary embodiment of the present invention.

FIG. 4 is a flowchart of a method for simulating a rewritable DVD according to an exemplary embodiment of the present invention.

Referring to FIG. 4, in step S401, the memory management unit 204 configures a plurality of logical blocks (for example, the logical blocks LBA(0)-LBA(L)) and maps the logical blocks to a portion of the physical blocks of the flash memory chip 106.

Then, in step S403, the memory management unit 204 groups a portion of the logical blocks into a logical unit (for example, the first logical unit 360). In step S405, the memory management unit 204 configures the logical unit as a rewritable DVD storage medium.

Next, in step S407, the memory management unit 204 declares to the host system 1000 that the logical unit is a rewritable DVD device. In step S409, the memory management unit 204 identifies rewritable DVD commands received from the host system 1000 and records data received from the host system 1000 into the physical blocks mapped to the logical blocks according to the rewritable DVD commands.

The mechanism for the memory management unit 204 to identify the rewritable DVD command has been described above therefore will not be described herein.

Figure 5:
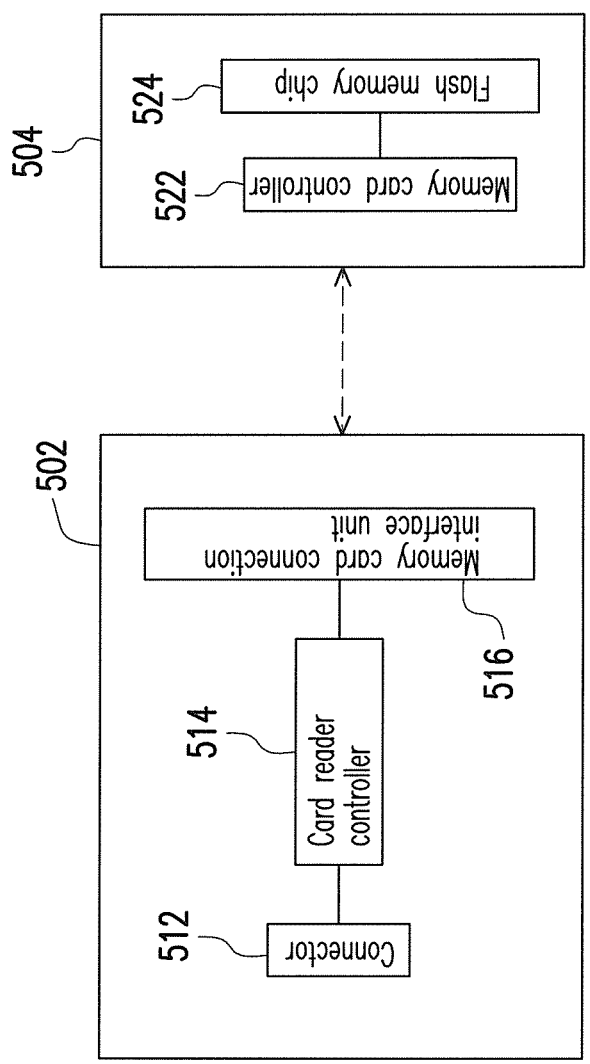
FIG. 5 is a block diagram of a flash memory storage system according to a second exemplary embodiment of the present invention.

FIG. 5 is a block diagram of a flash memory storage system according to a second exemplary embodiment of the present invention.

Referring to FIG. 5, the flash memory storage system 500 includes a card reader 502 and a removable memory card 504.

The card reader 502 includes a connector 512, a card reader controller 514, and a memory card connection interface unit 516.

The connector 512 is configured to couple to a host system 1000. In the present exemplary embodiment, the connector 512 is a USB connector. However, the present invention is not limited thereto, and the connector 512 may also be a PATA connector, a SATA connector, an IEEE 1394 connector, a PCI express connector, an IDE connector, or other suitable connector. In the present exemplary embodiment, the card reader 502 is coupled to the host system 1000 through the connector 512 in a detachable manner. However, the present invention is not limited thereto, and in another exemplary embodiment of the present invention, the card reader 502 may also be coupled to the host system 1000 in a fixed manner.

The card reader controller 514 is coupled to the connector 512 and configured to control the operation of the card reader 502. Particularly, in the present exemplary embodiment, the card reader controller 514 declares to the host system 1000 that the card reader 502 is a rewritable DVD device. For example, the card reader controller 514 declares to the host system 1000 that the card reader 502 is a disc device conforming to the DVD+RW specification, the DVD-RW specification, the DVD-RAM specification, or the BD specification. Besides, the card reader controller 514 identifies a rewritable DVD command received from the host system 1000 and operates the removable memory card 504 according to the rewritable DVD command. The mechanism for responding to the rewritable DVD command received from the host system 1000 has been described above therefore will not be described herein.

The memory card connection interface unit 516 is coupled to the card reader controller 514 and configured to couple to the removable memory card 504.

The removable memory card 504 is plugged into the card reader 502 in a detachable manner. The removable memory card 504 includes a memory card controller 522 and a flash memory chip 524.

The memory card controller 522 configures logical blocks and maps the logical blocks to the physical blocks so that the host system 1000 can access the flash memory chip 524 in the removable memory card 504 through the card reader 502.

To be specific, the card reader controller 514 declares to the host system 1000 that the removable memory card 504 is a rewritable DVD and identifies a rewritable DVD command from the host system 1000, and the memory card controller 522 executes a block management mechanism of the flash memory chip 524 and operates the flash memory chip 524 according to instructions of the card reader controller 514.

In the present exemplary embodiment, the flash memory chip 524 is the same as the flash memory chip 106, and therefore the structure and function of the flash memory chip 524 will not be described herein.

As described above, in exemplary embodiments of the present invention, a rewritable DVD device is simulated by using a flash memory storage device, and various data operations are performed on the simulated rewritable DVD device according to various rewritable DVD commands. Because the access speed of a flash memory storage system is faster than that of a general rewritable DVD system, the rewritable DVD device simulated by using the flash memory storage device has a faster access speed than a general rewritable DVD device. In addition, a rewritable DVD device simulated by using a flash memory storage device does not require any mechanical optical pickup. Accordingly the size of the rewritable DVD device is greatly reduced. Thereby, the rewritable DVD device simulated by using the flash memory storage device can be disposed in a small-sized netbook. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flash memory storage system, comprising:
a flash memory chip, having a plurality of physical blocks;
a connector, configured to couple to a host system; and
a controller, coupled to the flash memory chip and the connector and configured to configure a plurality of logical blocks and map the logical blocks to a portion of the physical blocks,
wherein the controller is further configured to identify at least one rewritable disc command from the host system and to write data from the host system into the physical blocks mapped to at least a portion of the logical blocks according to the at least one rewritable disc command,
wherein the controller is further configured to establish at least one management information of a rewritable disc device, wherein the at least one management information of the rewritable disc device comprises a written capacity parameter, and the written capacity parameter records a written capacity of the at least a portion of the logical blocks, wherein the written capacity parameter is updated according to a capacity of the data after the data is written,
wherein the written capacity parameter is also updated according to a size of a close section without the data being written,
wherein the controller is further configured to obtain a next writable address according to the written capacity parameter, and to write the data from the host system into the physical blocks starting from the physical block mapped to the logical block corresponding to the next writable address.

2. The flash memory storage system according to claim 1, wherein the controller stores the at least one management information of the rewritable disc device into one of the physical blocks.

3. The flash memory storage system according to claim 2, wherein the at least one management information of the rewritable disc device comprises storage status information, and the storage status information records a storage status of at least a portion of the logical blocks.

4. A flash memory storage system, comprising:
a flash memory chip, having a plurality of physical blocks;
a connector, configured to couple to a host system; and
a controller, coupled to the flash memory chip and the connector and configured to configure a plurality of logical blocks and map the logical blocks to a portion of the physical blocks, wherein one of the physical blocks stores at least one management information of a rewritable disc device, and the flash memory storage system allows the host system to identify at least a portion of the logical blocks as a rewritable storage medium of the rewritable disc device when the flash memory storage system is coupled to the host system by configuring the controller and the at least one management information of the rewritable disc device, wherein the controller uses a conversion parameter to calculate a logical address to be accessed and a capacity of data to be accessed based on a logical address and a capacity of data indicated by a read command or a write command corresponding to the rewritable disc device when the controller receives the read command or the write command from the host system, wherein the logical address to be accessed and the capacity of data to be accessed correspond to the flash memory chip, wherein the controller calculates the logical address to be accessed corresponding to the flash memory chip based on minute, second, and frame (MSF) parameters corresponding to a MSF read command by using a conversion expression when the controller receives the MSF read command.

5. The flash memory storage system according to claim 4, wherein the controller sends a single layer rewritable DVD message or a double layers rewritable DVD message back to the host system when the controller receives a storage medium feature inquiry command from the host system.

6. The flash memory storage system according to claim 4, wherein the controller sends a capacity value back to the host system when the controller receives a capacity inquiry command from the host system, wherein the capacity value is smaller than or equal to a capacity of the flash memory chip.

7. The flash memory storage system according to claim 4, further comprising a non-volatile memory, wherein the at least one management information of the rewritable disc device is stored in the non-volatile memory.

8. The flash memory storage system according to claim 4, wherein the at least one management information of the rewritable disc device comprises a storage status information, and the storage status information records a storage status of at least a portion of the logical blocks.

9. The flash memory storage system according to claim 8, wherein the controller marks the storage status information as a blank status when the controller receives a clear command from the host system.

10. The flash memory storage system according to claim 8, wherein the controller marks the storage status information as a non-blank status when the controller receives a format command or a close section command from the host system.

11. The flash memory storage system according to claim 8, wherein the controller determines whether the storage status information indicates a blank status when the controller receives a the read command from the host system, wherein the controller sends a null value back to the host system when the storage status information indicates the blank status.

12. The flash memory storage system according to claim 4, wherein the at least one management information of the rewritable disc device comprises a written capacity parameter, and the written capacity parameter records a written capacity of at least a portion of the logical blocks.

13. The flash memory storage system according to claim 12, wherein the controller initializes the written capacity parameter when the controller receives a format command or a clear command from the host system.

14. The flash memory storage system according to claim 12, wherein the controller updates the written capacity parameter after the controller receives the write command from the host system and writes the data into the physical blocks mapped to at least a portion of the logical blocks.

15. The flash memory storage system according to claim 12, wherein the controller sends a next writable address back to the host system according to the written capacity parameter when the controller receives a next writable address inquiry command from the host system.

16. The flash memory storage system according to claim 4, wherein the controller sends a non-support message back to the host system when the controller receives an error correction data inquiry command from the host system.

17. The flash memory storage system according to claim 4, wherein the conversion expression is as follows, $$LBA=((M\times 60+S-2)\times 75+F)\times 4$$

wherein LBA represents the logical address corresponding to the MSF read command in the flash memory chip, M represents a minute parameter of the MSF read command, S represents a second parameter of the MSF read command, and F represents a frame parameter of the MSF read command.

18. The flash memory storage system according to claim 4, wherein the controller sends a received message or a ready message back to the host system when the controller receives a disc eject command from the host system.

19. The flash memory storage system according to claim 4, wherein the host system identifies another portion of the logical blocks as a rewritable storage medium of a disk device, a read only storage medium of a compact disc read only memory (CD-ROM) device, or a rewritable storage medium of a rewritable disc device.

20. The flash memory storage system according to claim 4, wherein the controller sets a write protect information according to a command and writes the write protect information into one of the physical blocks, wherein the write protect information records whether the portion of the logical blocks is in a write-protected status or a non-write-protected status.

21. The flash memory storage system according to claim 20, wherein the controller determines whether the write protect information indicates the write-protected status when the controller receives a clear command, a format command, or a close section command from the host system, wherein the controller sends an error message back to the host system when the write protect information indicates the write-protected status.

22. The flash memory storage system according to claim 20, wherein the controller determines whether the write protect information indicates the write-protected status when the controller receives a storage medium feature inquiry command from the host system, wherein the controller sends a single layer read only DVD message or a double layer read only DVD message back to the host system when the write protect information indicates the write-protected status.

23. The flash memory storage system according to claim 4, wherein the conversion parameter is a ratio between the size of a logical access unit in the rewritable disc device and a size of a logical access unit in the flash memory storage system.

24. A flash memory controller, for managing a plurality of physical blocks of a flash memory chip, the flash memory controller comprising:

a microprocessor unit;

a flash memory interface unit, coupled to the microprocessor unit and configured to couple to the flash memory chip;

a host interface unit, coupled to the microprocessor unit and configured to couple to a host system; and a memory management unit, coupled to the microprocessor unit and configured to configure a plurality of logical blocks and maps the logical blocks to a portion of the physical blocks, wherein the memory management unit identifies at least one rewritable disc command from the host system and writes data from the host system into the physical blocks mapped to at least a portion of the logical blocks according to the at least one rewritable disc command, wherein the memory management unit establishes at least one management information of a rewritable disc device, wherein the at least one management information of the rewritable disc device comprises a written capacity parameter, and the written capacity parameter records a written capacity of at least a portion of the logical blocks, wherein the written capacity parameter is updated according to a capacity of the data after the data is written, wherein the written capacity parameter is also updated according to a size of a close section without the data being written, wherein the memory management unit obtains a next writable address according to the written capacity parameter and writes the data from the host system into the physical blocks starting from the physical block mapped to the logical block corresponding to the next writable address.

25. The flash memory controller according to claim 24, wherein the memory management unit stores the at least one management information of the rewritable disc device into one of the physical blocks.

26. The flash memory controller according to claim 25, wherein the at least one management information of the rewritable disc device comprises a storage status information, and the storage status information records a storage status of at least a portion of the logical blocks.

27. A computer system, comprising:
a central processing unit (CPU);
a main memory, coupled to the CPU; and
an embedded flash memory storage device, coupled to the CPU, wherein the embedded flash memory storage device comprises:
a flash memory chip, having a plurality of physical blocks; and
a controller, coupled to the flash memory chip and configured to configure a plurality of logical blocks and map the logical blocks to a portion of the physical blocks,
wherein the controller identifies at least one rewritable disc command from the CPU and writes data into the physical blocks mapped to at least a portion of the logical blocks according to the rewritable disc command,
wherein the controller uses a conversion parameter to calculate a logical address to be accessed and a capacity of data to be accessed based on a logical address and a capacity of data indicated by a read command or a write command of the rewritable disc command when the controller receives the read command or the write command from the CPU, wherein the logical address to be accessed and a capacity of data to be accessed correspond to the flash memory chip,
wherein the controller calculates the logical address to be accessed corresponding to the flash memory chip based on minute, second, and frame (MSF) parameters corresponding to a MSF read command by using a conversion expression when the controller receives the MSF read command from the CPU.

28. The computer system according to claim 27, wherein the controller establishes at least one management information of a rewritable disc device and stores the at least one management information of the rewritable disc device into one of the physical blocks.

29. The computer system according to claim 28, wherein the at least one management information of the rewritable disc device comprises a storage status information, and the storage status information records a storage status of at least a portion of the logical blocks.

30. The computer system according to claim 28, wherein the at least one management information of the rewritable disc device comprises a written capacity parameter, and the written capacity parameter records a written capacity of at least a portion of the logical blocks.

31. The computer system according to claim 27, wherein the conversion parameter is a ratio between the a size of a logical access unit in the rewritable disc device and a size of a logical access unit in the flash memory storage system.

32. A computer system, comprising:
a CPU;
a main memory, coupled to the CPU;
a card reader, coupled to the CPU, wherein the card reader comprises a card reader controller, and the card reader controller is configured to declare that the card reader is a rewritable disc device to the CPU; and
a removable memory card, plugged into the card reader, wherein the removable memory card comprises:
a flash memory chip, having a plurality of physical blocks; and
a memory card controller, coupled to the flash memory chip and configured to configure a plurality of logical blocks and maps the logical blocks to a portion of the physical blocks,
wherein the card reader controller identifies at least one rewritable disc command from the CPU and writes data into the physical blocks mapped to at least a portion of the logical blocks according to the rewritable disc command,
wherein the card reader controller uses a conversion parameter to calculate a logical address to be accessed and a capacity of data to be accessed based on a logical address and a capacity of data indicated by a read command or a write command when the controller receives the read command or the write command, wherein the logical address to be accessed and the capacity of data to be accessed correspond to the flash memory chip, wherein the card reader controller calculates the logical address to be accessed corresponding to the flash memory chip based on minute, second, and frame (MSF) parameters corresponding to a MSF read command by using a conversion expression when the card reader controller receives the MSF read command from the CPU.

33. The computer system according to claim 32, wherein the conversion parameter is a ratio between the a size of a logical access unit in the rewritable disc device and a size of a logical access unit in the flash memory storage system.

34. A flash memory storage system, comprising:
a card reader, comprising a card reader controller, wherein the card reader controller declares that the card reader is a rewritable disc device to a host system; and a removable memory card, plugged into the card reader, wherein the removable memory card comprises:

a flash memory chip, having a plurality of physical blocks; and a memory card controller, coupled to the flash memory chip and configured to configure a plurality of logical blocks and maps the logical blocks to a portion of the physical blocks, wherein the card reader controller identifies at least one rewritable disc command from the host system and writes data from the host system into the physical blocks mapped to at least a portion of the logical blocks according to the rewritable disc command, wherein the card reader controller uses a conversion parameter to calculate a logical address to be accessed and a capacity of data to be accessed based on a logical address and a capacity of data indicated by a read command or a write command of the at least one rewritable disc command when the controller receives the read command or the write command from the host system, wherein the logical address to be accessed and the capacity of data to be accessed correspond to the flash memory chip, wherein the card reader controller calculates the logical address to be accessed corresponding to the flash memory chip based on minute, second, and frame (MSF) parameters corresponding to a MSF read command by using a conversion expression when the card reader controller receives the MSF read command from the host system.

35. The flash memory storage system according to claim 34, wherein the conversion parameter is a ratio between the a size of a logical access unit in the rewritable disc device and a size of a logical access unit in the flash memory storage system.

36. A method for simulating a rewritable disc device by using a flash memory storage device, wherein the flash memory storage device has a flash memory chip, and the flash memory chip has a plurality of physical blocks, the method comprising:

configuring a plurality of logical blocks and mapping the logical blocks to a portion of the physical blocks, wherein the logical blocks have a plurality of logical addresses, the physical blocks have a plurality of physical addresses, and mapping relationships exist between the logical addresses and the physical addresses;

storing at least one management information of the rewritable disc device into one of the physical blocks;

responding to a host system to access the flash memory storage device according to the at least one management information of the rewritable disc device;

using a conversion parameter to calculate a written logical address and a quantity of data corresponding to a write command of at least one rewritable disc command given by the host system, wherein the written logical address is one of the logical addresses; and using a conversion expression to calculate a logical address to be accessed corresponding to the flash memory chip based on minute, second, and frame (MSF) parameters corresponding to a MSF read command given by the host system.

37. The method according to claim 36, wherein when data is written into one of the physical blocks according to the rewritable disc command and a write error occurs, the data is written into another one of the physical blocks.

38. The method according to claim 36, wherein the at least one management information of the rewritable disc device comprises a storage status information, and the storage status information records a storage status of at least a portion of the logical blocks.

39. The method according to claim 36, wherein the at least one management information of the rewritable disc device comprises a written capacity parameter, and the written capacity parameter records a written capacity of at least a portion of the logical blocks.

40. The method according to claim 36, wherein the conversion parameter is a ratio between the a size of a logical access unit in the rewritable disc device and a size of a logical access unit in the flash memory storage system.

* * * * *